(12) United States Patent
Khorram

(10) Patent No.: US 6,985,721 B1
(45) Date of Patent: Jan. 10, 2006

(54) METHOD AND APPARATUS FOR REDUCING BANDWIDTH USE IN A PORTABLE DEVICE

(76) Inventor: Ramin Khorram, 5 Tsienneto Rd., #2, Derry, NH (US) 03038

( * ) Notice: Subject to any disclaimer, the term of this patent is extended or adjusted under 35 U.S.C. 154(b) by 880 days.

(21) Appl. No.: 09/588,280

(22) Filed: Jun. 5, 2000

(51) Int. Cl.
  *H04M 3/42*   (2006.01)
(52) U.S. Cl. .............................. 455/414.1; 455/412.1; 455/556.2; 340/7.53; 709/206
(58) Field of Classification Search .............. 455/466, 455/186.1, 412, 566, 575; 340/7.52, 7.53, 340/7.47, 7.48; 709/217, 227, 219
See application file for complete search history.

(56) References Cited

U.S. PATENT DOCUMENTS

| | | | | |
|---|---|---|---|---|
| 4,336,524 A | * | 6/1982 | Levine | 340/7.53 |
| 4,382,256 A | * | 5/1983 | Nagata | 340/7.29 |
| 5,066,949 A | * | 11/1991 | Breeden et al. | 340/7.28 |
| 5,379,339 A | * | 1/1995 | Sakamoto | 455/461 |
| 5,448,765 A | * | 9/1995 | Kovanen et al. | 379/357.01 |
| 5,574,439 A | * | 11/1996 | Miyashita | 340/7.53 |
| 5,630,207 A | * | 5/1997 | Gitlin et al. | 340/7.23 |
| 5,635,918 A | * | 6/1997 | Tett | 340/7.29 |
| 5,673,322 A | * | 9/1997 | Pepe et al. | 705/52 |
| 5,850,594 A | * | 12/1998 | Cannon et al. | 340/7.21 |
| 5,894,506 A | * | 4/1999 | Pinter | 340/7.53 |
| 5,895,471 A | * | 4/1999 | King et al. | 707/104.1 |
| 5,948,066 A | * | 9/1999 | Whalen et al. | 709/229 |
| 5,974,447 A | * | 10/1999 | Cannon et al. | 709/206 |
| 6,041,045 A | * | 3/2000 | Alterman et al. | 370/313 |
| 6,081,815 A | * | 6/2000 | Spitznagel et al. | 715/501.1 |
| 6,208,839 B1 | * | 3/2001 | Davani | 340/7.2 |
| 6,253,061 B1 | * | 6/2001 | Helferich | 340/7.22 |
| 6,349,202 B1 | * | 2/2002 | Odamura | 455/412.1 |
| 6,405,060 B1 | * | 6/2002 | Schroeder et al. | 345/169 |
| 6,473,621 B1 | * | 10/2002 | Heie | 455/466 |
| 6,486,794 B1 | * | 11/2002 | Calistro et al. | 340/825.49 |
| 6,553,103 B1 | * | 4/2003 | Forlenza et al. | 379/93.01 |

\* cited by examiner

*Primary Examiner*—Charles N. Appiah
(74) *Attorney, Agent, or Firm*—Blakely, Sokoloff, Taylor & Zafman LLP; Judith A. Szepesi

(57) ABSTRACT

A method and apparatus for reducing bandwidth use in a portable device is provided. A method of using a storage module in a device comprises receiving data in the device and identifying a code in the data. The method further comprises replacing the code in the data with corresponding terms in the storage module, prior to displaying the data.

5 Claims, 8 Drawing Sheets

METHOD AND APPARATUS FOR REDUCING BANDWIDTH USE IN A PORTABLE DEVICE

FIELD OF THE INVENTION

The present invention relates to bandwidth reduction, and more specifically, to caching to reduce bandwidth.

BACKGROUND

"Caching" is a known technique for reducing bandwidth or latency in data transmissions. Conventional methods of caching work by keeping a local store of memory (the cache) where received data is kept in anticipation of future need.

There are two main methods for filling the cache:

1) Whenever something is requested, keep the received data in the cache for a time in case it is needed again. If the prediction is true, subsequent lookups from the local cache are both faster and save bandwidth in the transmission channel; and 2) Whenever something is requested, request logically following items whenever there is idle time in the transmission channel. In this case, some of the bandwidth is likely to be wasted because it is not always possible to predict with 100% accuracy what data is needed next. However, any time the prediction is true the latency is improved because the request for the data and therefore the transmission occurs earlier than without the pre-fetching.

Note that the first transmission of the data is never eliminated with a conventional cache. The data may be compressed, but it still needs to be transmitted at least once.

A conventional cache requires read/write memory and typically has limited storage space, so there is usually some policy to decide when something is eliminated from the cache to make room for new entries. For example, the time since the last access might be used to delete the oldest entries. Therefore, if data from the conventional cache is used relatively infrequently, it might never be in the cache when needed.

Furthermore, conventional caches are based on decision making only at the receiving end of the transmission channel. The transmitter only sends data in response to requests, and is not aware of which data will be cached, or what the current status of the cache is. Therefore, even if a large amount of inexpensive processing power is available at the transmitter, in a conventional caching system this processing power cannot be used to improve the cache hit ratio and therefore the reduce consumption of expensive bandwidth.

SUMMARY OF THE INVENTION

A method and apparatus for reducing bandwidth use in a portable device is provided. A method of using a storage module in a device comprises receiving data in the device and identifying a code in the data. The method further comprises replacing the code in the data with a corresponding term in the storage module, prior to displaying the data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
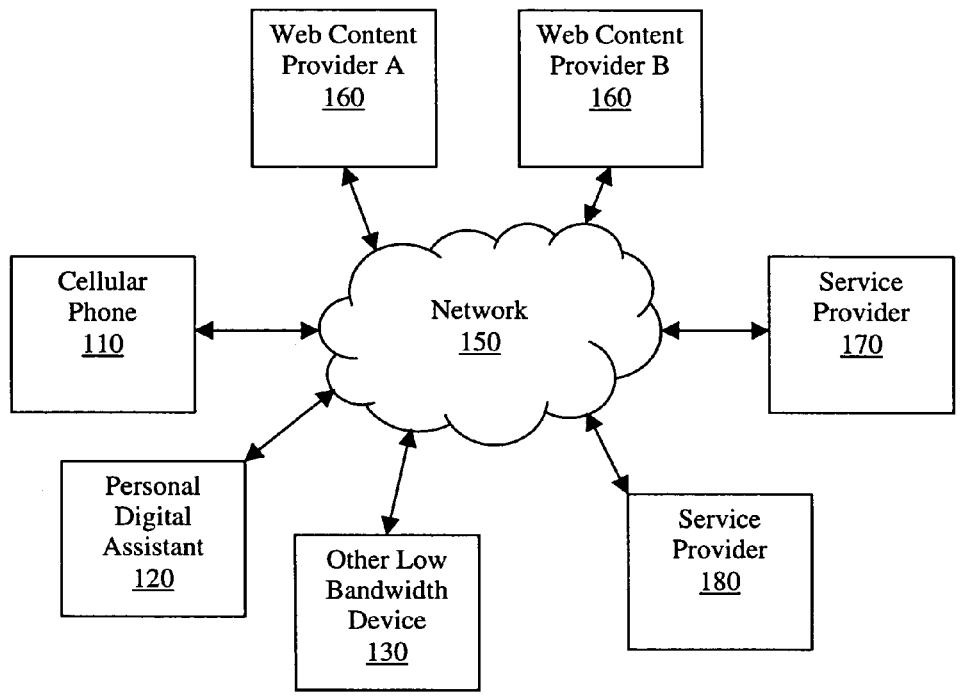
FIG. 1 is a block diagram of one embodiment of a network.

A method and apparatus for reducing bandwidth use in a portable device is described. A cellular telephone or personal digital assistant (PDA) with an integrated Internet browser, for example, is bandwidth constrained. Today it is on the order of several kilobits per second. Furthermore, downloading data over the Internet using such a device is expensive.

The apparatus of the present invention uses a mass storage module, such as a Clik! disk™ or flash memory card to reduce the bandwidth requirement for accessing data on the Internet. The mass storage device may be a magnetic storage device such as an IBM MicroDrive, or an optical storage device such as CD, DVD, or CD-RW.

For one embodiment, if the device already includes I/O logic and mass storage modules for other purposes, the present system may use those preexisting modules and logic. For example, certain devices are now including such mass storage capability for storing music or other data. A portion of this existing mass storage capability may be used to implement this caching system.

The mass storage module may be 40 or 128 Megabytes, or more. Periodically, the user receives a new module and places it in the portable device. As the user browses the Internet, sometimes packets of data are retrieved from the module instead of everything being downloaded from the net. For example, given that the phrase "The Clinton Administration" is likely to occur often in news reports, this phrase is coded and stored in the module. Instead of the whole phrase being sent down the wireless connection, a simple short code is sent to the wireless browser. The code indicates where on the local mass storage module the full phrase should be fetched from. Similarly, instead of sending the whole graphics for a given corporate logo, a code is sent to retrieve it from the local mass storage module. The terms that are substituted may include a word, a phrase, a graphic element, an image, a graphic animation sequence, a video clip, a sound clip, an applet, a binary large object (BLOB), or any other type of data.

For one embodiment, as the portable device is being used, it keeps track of how often data from the local module was used instead of transmission, and the "hit ratio" or "savings ratio" is computed and occasionally transmitted back to the service providing this service. When the hit ratio drops below the expected level, the service provider sends a new module with updated data, or the user plugs his phone into a broadband connection like a PC on a cable modem where a bulk download occurs. Thus, by periodically updating the mass storage module, the maximum hit ratio may be achieved.

The data processing, including analysis of the access patterns of many users, occurs at the service provider in order to prepare new versions of the mass storage module data for good savings ratios. This is transparent to the user, except that the user occasionally needs to update their cache. Thus, using this system, bandwidth is saved using inexpensive mass storage at the client and inexpensive processing power at the server.

FIG. 1 is a block diagram of one embodiment of a network. A plurality of devices may receive data from network 150 via a wireless connection, or another type of connection. These devices may be cellular phones 110, personal digital assistants (PDAs) 120, or other low bandwidth devices 130. These devices may connect to the Internet via a wireless connection, such as WAP, or via another type of connection. The network 150 is further coupled to a plurality of web sites 160, providing content.

Furthermore, service providers (ISP) 170, 180 are coupled to network 150. ISPs 170, 180 provide web content to various devices 110, 120, 130. ISPs 170, 180 obtain data from web sites 160, in response to requests from devices 110, 120, or 130, and transmit a formatted version of the web content to the requesting device. This is generally done because the data is reformatted to permit display on the limited display of devices 110, 120, 130. For another embodiment, certain web sites 160 may also provide the data directly to devices 110, 120, 130 in the appropriate format.

Figure 2:
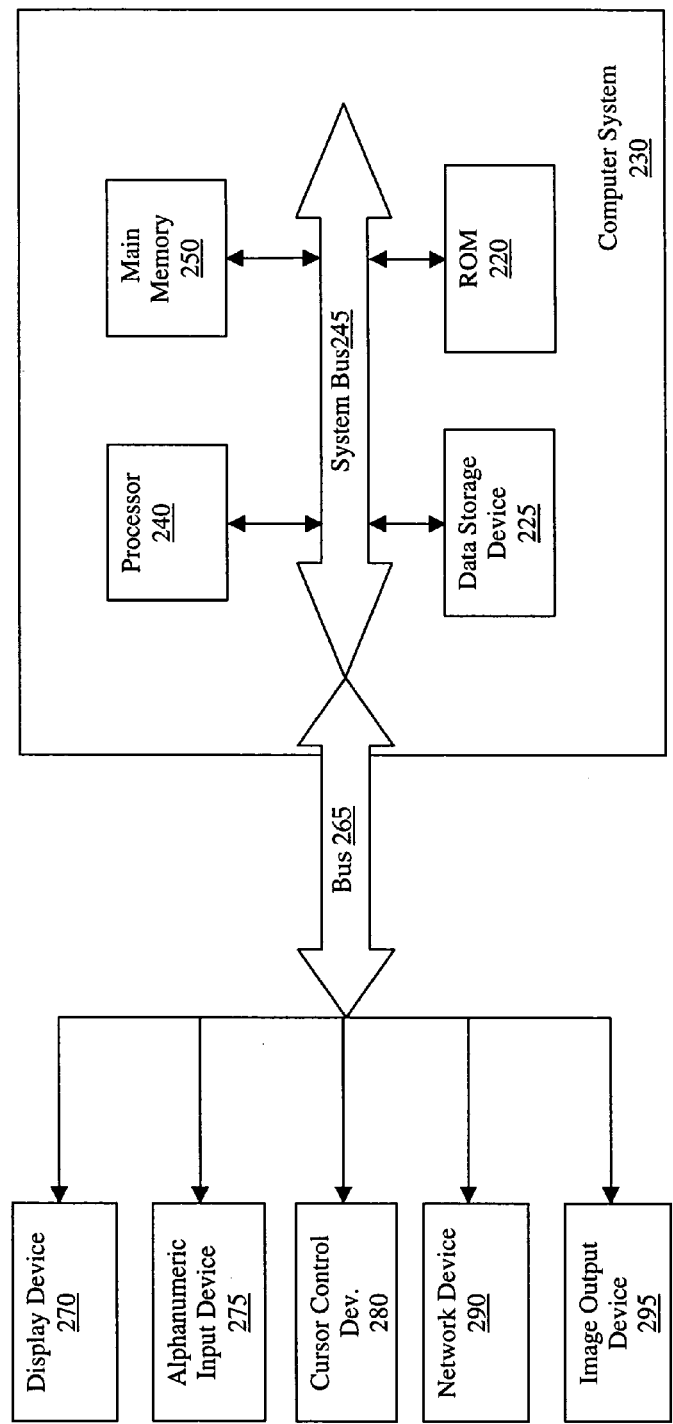
FIG. 2 is a block diagram of one embodiment of a computer system.

FIG. 2 shows one example of a conventional computer system that can be used as a client computer system or a server computer system or as a web server system. It will also be appreciated that such a computer system can be used to perform many of the functions of an Internet service provider, such as ISP 170, 180. The computer system 230 interfaces to external systems through the modem or network device 290. It will be appreciated that the modem or network interface 290 can be considered to be part of the computer system 230. This interface 290 can be an analog modem, ISDN modem, cable modem, token ring interface, satellite transmission interface (e.g. "Direct PC"), frame relay, wireless connection or another interface for coupling a computer system to other computer systems. The computer system 230 includes a processor 240, which can be a conventional microprocessor such as an Intel Pentium microprocessor or Motorola Power PC microprocessor.

Memory 250 is coupled to the processor 240 by a bus 245. Memory 250 can be dynamic random access memory (DRAM) and can also include static RAM (SRAM). The bus 245 couples the processor 240 to the memory 250 and also to non-volatile storage 225 and to display device and input/output (I/O) controller. The display controller controls in the conventional manner a display on a display device 270 which can be a cathode ray tube (CRT) or liquid crystal display. The input/output devices 275, 280, 295 can include a keyboard, a pen or similar device, disk drives, printers, a scanner, and other input and output devices, including a mouse or other pointing device. The display controller and the I/O controller can be implemented with conventional well known technology.

The non-volatile storage 220 is often a magnetic hard disk, an optical disc, or another form of storage for large amounts of data. Some of this data is often written, by a direct memory access process, into memory 250 during execution of software in the computer system 230. One of skill in the art will immediately recognize that the term "computer-readable medium" includes any type of storage device that is accessible by the processor 240. Computer-readable medium may further include multiple separate types of data, such as a hard disk and flash memory.

It will be appreciated by those of ordinary skill in the art that any configuration of the system may be used for various purposes according to the particular implementation. The control logic or software implementing the present invention can be stored in main memory 250, mass storage device 225, or other storage medium locally or remotely accessible to processor 240. Other storage media may include floppy disks, memory cards, flash memory, or CD-ROM drives.

It will be apparent to those of ordinary skill in the art that the methods and processes described herein can be implemented as software stored in main memory 250 or read only memory 220 and executed by processor 240. This control logic or software may also be resident on an article of manufacture comprising a computer readable medium having computer readable program code embodied therein and being readable by the mass storage device 225 and for causing the processor 240 to operate in accordance with the methods and teachings herein.

The present invention may also be embodied in a handheld or portable device containing a subset of the computer hardware components described above. For example, the handheld device may be configured to contain only the bus 245, the processor 240, and memory 250 and/or 225. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

It will also be appreciated that the computer system 230 is controlled by operating system software which includes a file management system, such as a disk operating system, which is part of the operating system software. One example of an operating system software with its associated file management system software is the operating system known as Windows 95® from Microsoft Corporation of Redmond, Wash., and its associated file management system. The file management system is typically stored in the non-volatile storage 225 and causes the processor 240 to execute the various acts required by the operating system to input and output data and to store data in memory, including storing files on the non-volatile storage 225.

Figure 3:
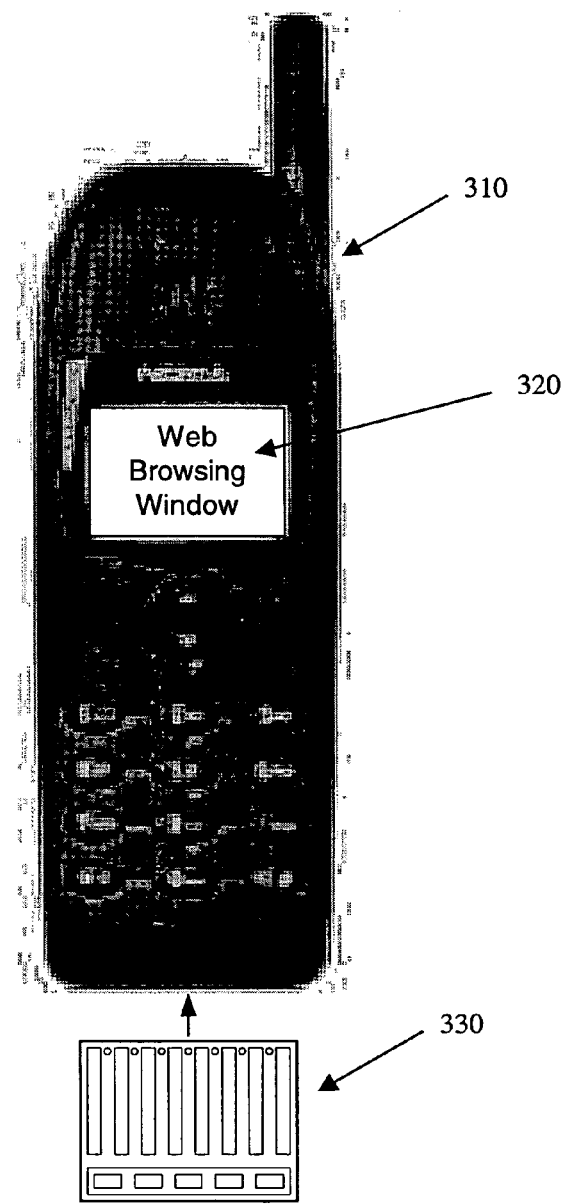
FIG. 3 is an exploded view of one embodiment of a cellular phone including a mass storage unit.

FIG. 3 is an exploded view of one embodiment of a cellular phone including a mass storage unit. The cellular phone 310 includes a display 320, which can provide access to data obtained from the Internet. The use of cellular telephones 310 for Internet access is known in the art. A memory card 330 may be inserted into a slot in the cellular phone 310. The memory card 330 may be a flash memory card, a Clik! disk, or a different type of mass memory storage. For one embodiment, the cellular phone 310 may have an existing PCMCIA slot which may be used to receive this memory card 330. Alternatively, there may be a separate slot to receive a device such as the memory card 330.

For one embodiment, if the device is a personal digital assistant (PDA), the memory card 330 may fit into a special slot, such as the Springboard™ slot in a Handspring™ device. Alternatively, the memory card 330 may fit into another type of slot or drive on the portable device.

Figure 4:
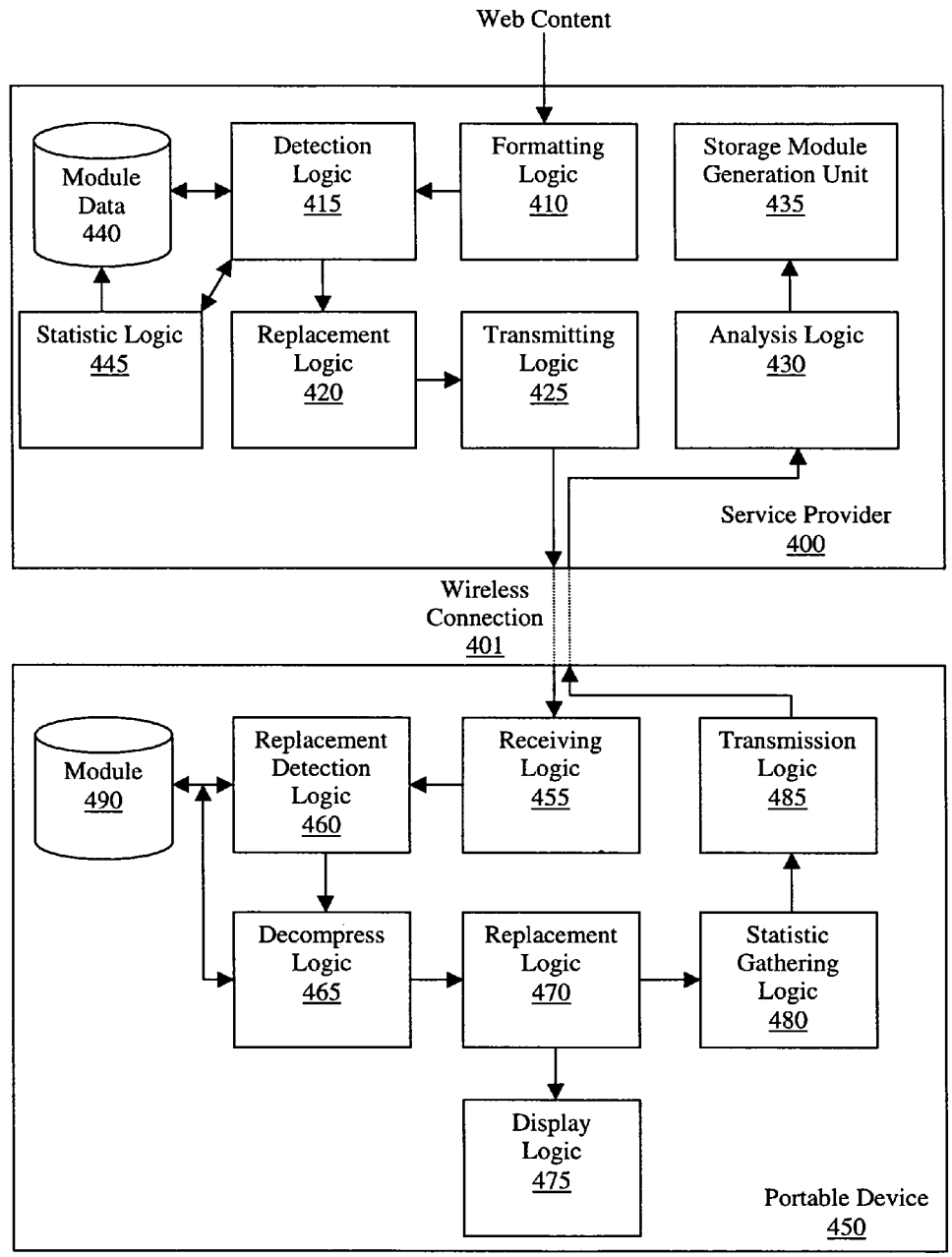
FIG. 4 is a block diagram of one embodiment of the server and the cellular phone including the mass storage unit.

FIG. 4 is a block diagram of one embodiment of the server and the cellular phone including the mass storage unit. The service provider 400 includes data transmitting logic 425 to transmit data over a connection 401 to portable device 450. For one embodiment, connection 401 is a wireless connection. For another embodiment, connection 401 may be another type of bandwidth constrained connection. For one embodiment, the portable device 450 maybe be a cellular telephone or PDA. Alternatively, the portable device 450 may be any other type of device that receives data over a bandwidth constrained connection. For one embodiment, portable device 450 need not be portable.

Service provider 400 includes data formatting logic 410. Data formatting logic 410 receives web content from various sites. The data formatting logic 410 formats data, such as web content, for display on portable device 450. Generally, portable device 450 is constrained by a limited screen size, and data is formatted by data formatting logic 410 to be optimally displayed on portable device 450. For another embodiment, the data formatting logic 410 may not do anything.

Stored data detection logic 415 determines if any portion of the web content to be transmitted to portable device 450 is present in the module 490 in portable device 450. Module data 440 identifies the data present in module 490. For one embodiment, each individual user may have a personalized module 490, and thus module data 440 includes information for each user. In that instance, the stored data detection logic 415 determines the identity of the user, and whether the corresponding module data includes any portion of the web content. For another embodiment, the module 490 is identical for a group of users, or all users, and only the user's group is identified prior to determining whether any of the content to be presented is in the module data 440.

For one embodiment, service provider 400 may further include statistic gathering logic 445. For one embodiment, statistics gathering logic 445 determines all of the terms in the data gathered for display, and identifies which of those terms were included in the module data 440. For one embodiment, the statistic gathering logic 445 maintains comprehensive statistics identifiable by user/group/etc.

If stored data detection logic 415 identifies any data in the user's module 490, data replacement logic 420 replaces the data in question with a code. For one embodiment, the code may simply be an abbreviation or similar identifier of the data. For another embodiment, the code may be the address of the data in the user's module 490. Alternative methods of designating such data may be used.

The data transmitting logic 425 then transmits the data, including any codes inserted by data replacement 420 to portable device 450. As is obvious, by replacing complex/long data with a code, the size of the data transmitted by data transmitting logic 425 is reduced.

In the portable device 450, data receiving logic 455 receives the data from data transmitting logic 425. Data receiving logic passes the data to replacement detection logic 460. Replacement detection logic 460 detects codes inserted by data replacement logic 420. Replacement detection logic 460 identifies the substituted data, and passes this information to decompress logic 465.

Figure 8:
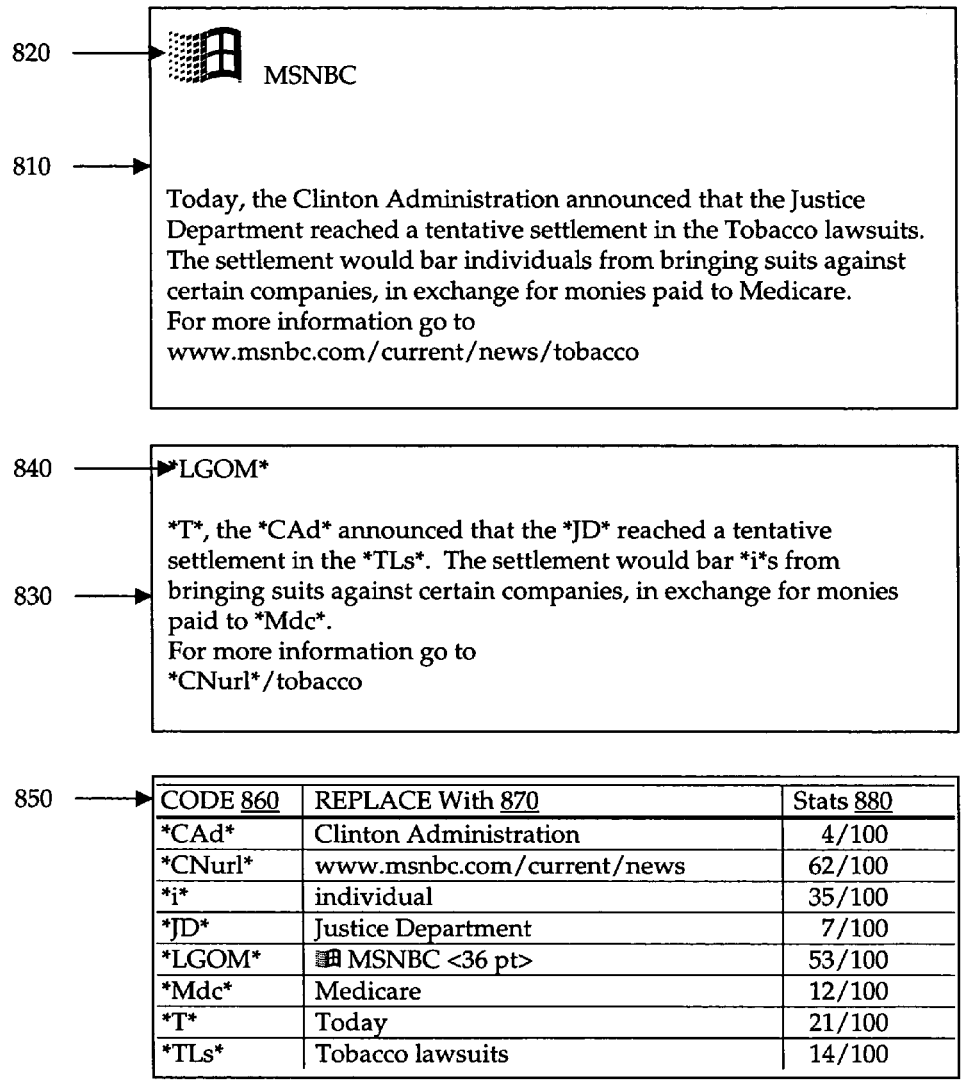
FIG. 8 is an example of one embodiment of substitution.

FIG. 8 illustrates a block of original text 810, including a logo 820. FIG. 8 also shows the replacement text 830, with codes 840 replacing certain portions of the text. FIG. 8 further shows the portion of the module 850 including codes 860 and matching text/data 870. It is to be understood that FIG. 8 is merely exemplary. The "*" identifying substitution data is merely exemplary. For one embodiment, a certain code may be used to identify a code.

Returning to FIG. 4, decompress logic 465 may decompress the data and/or the codes stored in module 490. For one embodiment, the data is stored in module 490 in a compressed form. Thus, based on the codes identified by replacement detection logic 460, decompress logic 465 identifies the appropriate data in module 490, and decompresses the data. Data replacement logic 470 then makes the substitution, to reproduce original text 810. This original text is then passed to data display logic 475. Note that replacement detection logic 460, decompress logic 465, and replacement logic 470 are individually discussed for completeness. These functions may be combined into a single logical step.

For one embodiment, portable module 450 may further include statistic gathering logic 480. Statistic gathering logic 480 identifies the codes that were used in this particular data. An example of the statistics gathered is shown in FIG. 8, as Statistics 880. Statistics 880 identify how often out of the number of received messages the term in question was used. Using the known bandwidth savings for each substitution and the known cost of bandwidth, the total saved bandwidth and cost can be calculated and shown to the user.

For one embodiment, if all the data for a given device is transmitted from one source, statistic gathering logic 480 may be within service provider 400. In that case, Service Provider 400 may also compute statistics that would have resulted if the user upgraded, updated his or her module, or subscribed to an alternate module content set, and thus showing the benefit of upgrading or specializing the cache contents.

Returning to FIG. 4, a statistic transmission logic 485 periodically transmits this data to service provider 440. For one embodiment, this data is transmitted when there is a connection between portable device 450 and service provider 400, and bandwidth is available. For another embodiment, this data is transmitted on a schedule, periodically.

Figure 7:
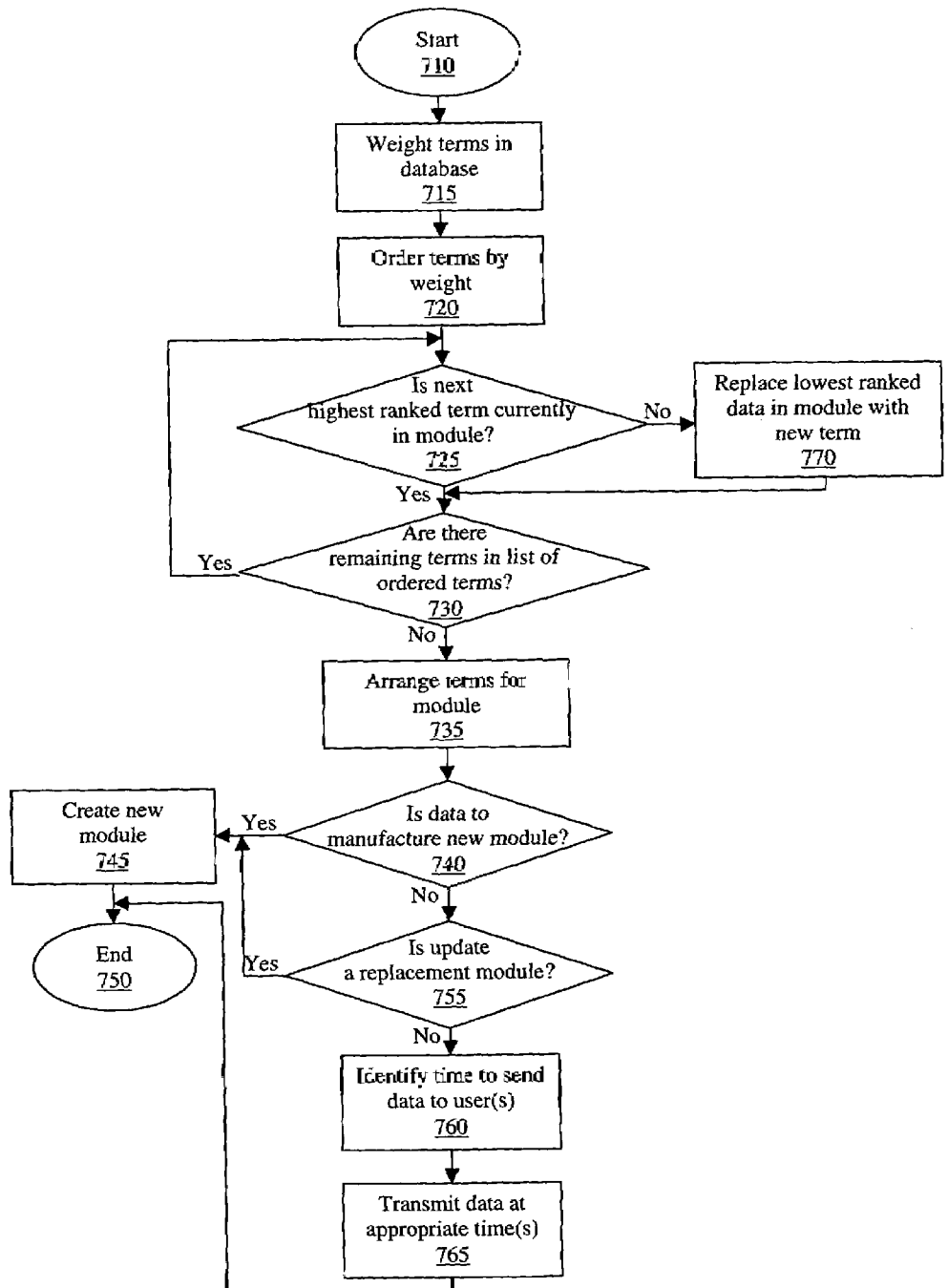
FIG. 7 is a flowchart of one embodiment of the process of updating the contents of the mass storage unit.

Service provider 400 includes stored data analysis logic 430, for analyzing the statistics gathered by statistic gathering logic 445 and/or statistics gathering logic 480. For one embodiment, stored data analysis logic 430 determines which terms would be optimal to store in module 490. For one embodiment, the criteria for storing data in module 490 are that the data occurs on a regular basis, and that by storing the data in the module 490, a certain threshold of bandwidth savings can be achieved. For example, the term "an", although it occurs on a regular basis, is probably not useful in module 490, because the bandwidth savings are minimal, since the word is so short. However, a logo, for example, may be useful to store. For one embodiment, font sizes may further affect whether data is stored. FIG. 7 shows the method of selecting which data to store in more detail. The data selected for storage is passed to mass storage module generation unit 435. For one embodiment, if this is during initial set-up, mass storage module generation unit 435 interfaces with a hardware device for manufacturing flash cards/Clik! disks, etc. For another embodiment, if the mass storage module 490 is updateable, then mass storage module generation unit 435 transmits the updated data to module 490. For one embodiment, this occurs when user interfaces portable device 450 with a high bandwidth connection. For example, user may insert the PDA into a socket coupled to a computer. For another embodiment, module 490 may be updated over low bandwidth connection 401. Methods of updating such a mass storage module 490 are known in the art.

Figure 5:
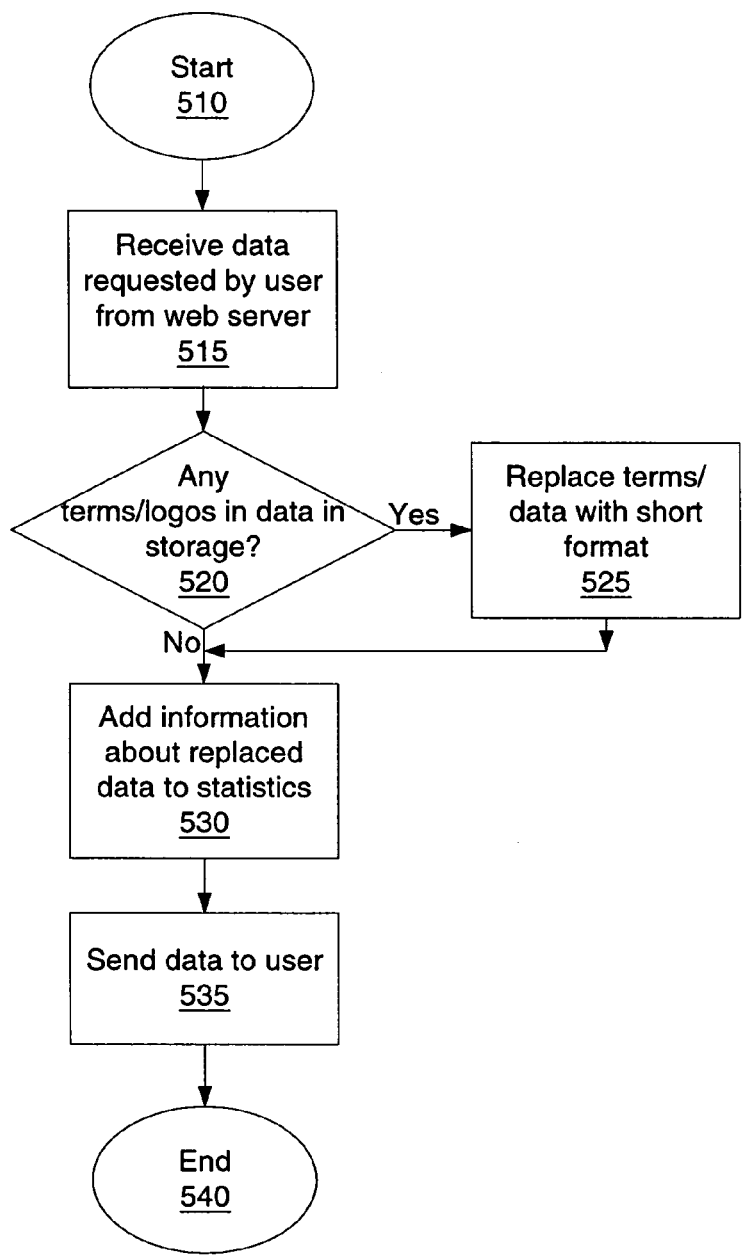
FIG. 5 is a flowchart of one embodiment of the process of using the system from the server's perspective.

FIG. 5 is a flowchart of one embodiment of the process of using the system from the service provider's perspective. The process starts at block 510. At block 515, the service provider receives data requested by user from web server. For one embodiment, the user passes requests for data through service provider. For another embodiment, there are periodic automatic data requests. For example, a user may request periodic news updates, or updates of sports scores, as the game is played. Thus, the data requested may be requested directly by user, or through an automated request system.

At block 520, the process determines whether any of the data in the requested data set is in the mass storage device of the user. For one embodiment, the user may have a personalized mass storage device, and this match is made by first identifying the user, and then making the match to the database.

For another embodiment, the mass storage device may be identical for a group of people. For example, the mass storage device may be oriented toward sports lovers. The group of sports lovers may have the common terms transmitted in common. For example, the names of the teams may be in the mass storage device for the group of sports lovers.

The advantage of having an entire group share a mass storage device content set is that the processing only has to occur once. In other words, the service provider may store the data retrieved for any member of the group, and if another member of the group requests the same data, the process of identifying terms/logos in the data and substituting codes (blocks 520–525) may be skipped. For a user of a specific group, an additional advantage of having cache content already customized for this group is that the cache hit ratio and bandwidth savings are likely to be higher.

For yet another embodiment, all of the members supported by service provider have identical mass storage device data. Thus, each data set is only processed once.

If there was data to be substituted, the process continues to block 525, and the terms/data is replaced with the code. This is shown in FIG. 8, as codes 840. The process then continues to block 530. If there was no data to be substituted, the process continues directly to block 530.

At block 530, information about the substituted data is added to the statistics. As discussed above, these statistics are used to update the mass storage device periodically.

At block 535, the data is sent to the user(s). The process then ends. As discussed above, for one embodiment, this process is only performed once for each set of users who share a mass storage device content set. Thus, for one embodiment, the process first determines if the substitution has already taken place for this data set for this user/user's group. For one embodiment, before the data is sent, it is additionally tagged with identification of the user's group.

Figure 6:
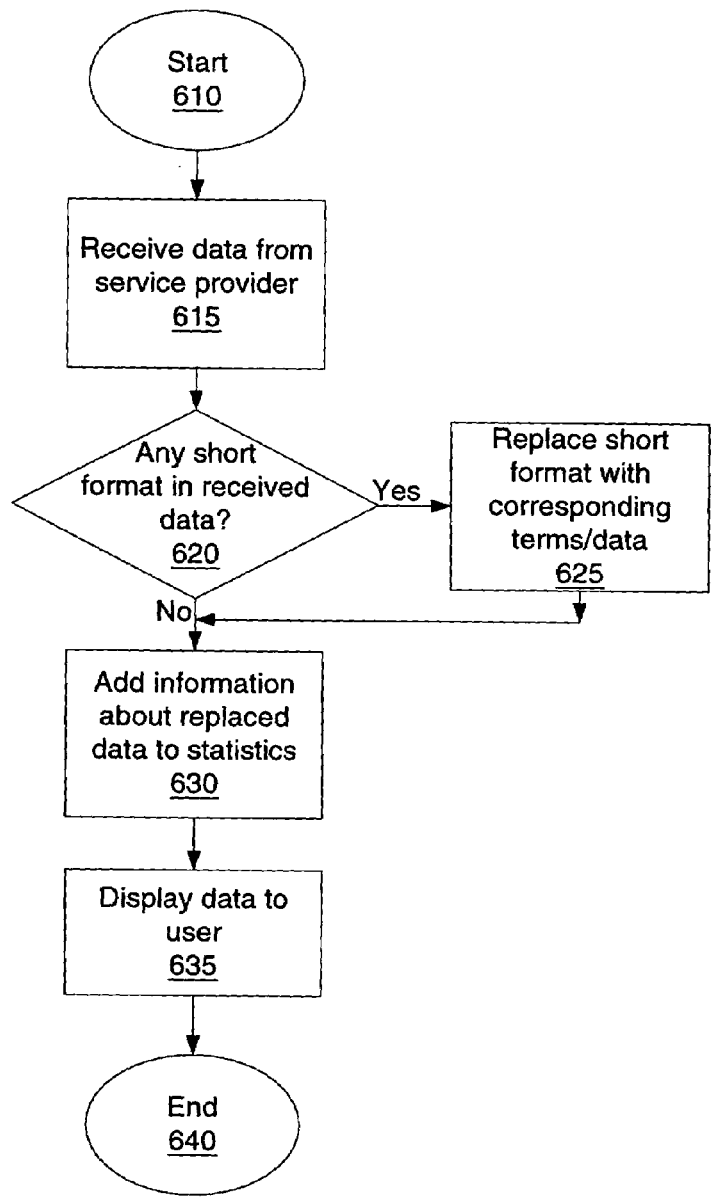
FIG. 6 is a flowchart of one embodiment of the process of using the system from the client's perspective.

FIG. 6 is a flowchart of one embodiment of the process of using the system from the client's perspective. The process starts at block 610. For one embodiment, the process may start when the user requests certain data. For another embodiment, the process may start when a periodic sending of data is requested.

At block 615, data is received from the service provider. For one embodiment, the data is received via a wireless connection.

At block 620, the process determines whether there are any codes or "short formats" in the received data. These codes are shown in FIG. 8, showing an example of the data received by the device (830). If there are codes in the data received, the process continues to block 625. At block 625, the codes are replaced with the corresponding terms/data from the mass storage module.

At block 630, the data about which codes were found in the data received is added to the statistics. These statistics are periodically collected, and used to compile subsequent mass storage modules.

At block 635, the data is displayed to the user. As discussed above, the device which is displaying this data may be a smaller device, such as a cellular phone screen or a PDA screen. Thus, the data may be appropriately formatted prior to being sent. For another embodiment, the formatting may take place on the device. The process then ends at block 640.

FIG. 7 is a flowchart of one embodiment of the process of generating a mass storage unit. Initially when a mass storage unit (storage module) is prepared by the service provider, this storage module is sent to the user. For one embodiment, the storage module is sent via physical mail. For another embodiment, the user may acquire a storage module at a retail establishment, for example concurrently with purchasing a cellular telephone or PDA. For one embodiment, updates to the contents of the storage module are sent to the user either via the wireless low bandwidth connection when there is a low utilization of bandwidth, or via an alternative connection. For example, the user may place the device in a docking module, coupling the device to the higher bandwidth connection available through a computer system, and the storage module may be updated in that way. For yet another embodiment, the storage module may be physically exchanged for a new storage module periodically. In any of these cases, the contents of the storage module are generated by the service provider, as described below.

As discussed above, the storage modules may be identical for all users, identical for a group of users but varying among groups, or individually targeted. The below description assumes that the data being evaluated is specific to the storage module being designed. Thus, if the storage modules are individually targeted, this process is executed for each user.

Returning to FIG. 7, the process starts at block 710. For one embodiment, this process uses the statistics gathered by the service provider, which indicate all of the terms transmitted to the devices, and how often each term was transmitted.

At block 715, each term is weighted. For one embodiment, weighting comprises determining a number of occurrences for the term and the bandwidth saved by encoding the term. For example, the weighting may be W=# of occurrences * length of term. Alternative methods of determining this value may be used. However, the preference should be for longer terms that occur frequently.

At block 720, the terms with the highest weight are selected and ordered by weight. For one embodiment, there is a limited number of terms that may be present on the storage module. Therefore, the terms N that is the maximum number of terms that may be present on the storage module are selected.

At block 725, the process selects the highest ranked term, and determines whether the term is already in the module. If the term is already in the module, the process continues to block 730.

If the term is not in the module, the process continues to block 770. At block 770, the process determines a least often used term in the module. For one embodiment, the statistics gathered by the device during the use of the module are used to make this determination.

At block 775, the least often used term in the module is removed, and the new term is placed in the module. For one embodiment, multiple terms may be removed to make space for a single longer term. The process then returns to block 725.

If, at block 725, the term was found to be in the module, the process continues to block 730. At block 730, the process determines whether there are any remaining terms in the selected set of terms. If there are no remaining terms, the process continues to block 735. Otherwise, the process returns to block 725.

At block 735, the set of terms that are designated for the module are arranged. For one embodiment, the arrangement may be by code, or by length, or by frequency of use, or by another sorting mechanism.

At block 740, the process determines whether the module data is to create new module(s), or to update the contents of old module(s). If the module data is to create a new module, the process continues to block 745.

At block 745, a new module is created. For one embodiment, the new module may be a flash memory. For another embodiment, the module may be a Clik! disk, or another form of data storage device. In any case, the module is created as appropriate. For one embodiment, if a large number of users share a single module, the module may be created en-masse, as is known in the art. The process then ends at block 750.

If, at block 740, the process found that the module data is to update the contents of an old module, the process continues to block 755.

At block 755, the process determines whether the update is by sending the data to the user's system, or by making a substitute module. If the update is by making a substitute module, the process continues to block 745. Otherwise, the process continues to block 760.

At block 760, the process determines when an appropriate time is to send the data to the user. As discussed above, for one embodiment, a low bandwidth use time is detected. For another embodiment, a time of expected low bandwidth use is predicted, and used—such as 4 a.m. For yet another embodiment, the system waits until the user connects the device to a high bandwidth connection.

At block 765, at the appropriate time, the data is transmitted to the user. The process then continues to block 750, and ends.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A service provider for providing data to a device via a low bandwidth connection, the service provider comprising:
    a database including a plurality of codes and associated terms, the codes and terms corresponding to codes and terms in a storage module in the device;
    an analysis logic to receive a request for data from the device a formatting logic to retrieve response data in response to the request from the device;
    a substitution logic to automatically replace a term in the response data with a code, the automatically substituted code reducing a size of the response data; and
    a transmission logic to transmit the response data including the code to the device, such that the device is capable of replacing the code with the original term prior to displaying the data to the user.

2. The service provider of claim 1, further comprising:
    a statistic gathering logic to gather statistics about a frequency of occurrence of each terms in the data.

3. The service provider of claim 2, further comprising:
    an analyzing logic to analyze statistics and determine a set of useful terms for inclusion in the database.

4. The service provider of claim 3, further comprising:
    a storage module updating unit to generate an updated data set for the database and for a storage module.

5. The service provider of claim 1, wherein the data in the database is periodically updated.

* * * * *